US012360237B2

(12) United States Patent
Tapia (10) Patent No.: US 12,360,237 B2
(45) Date of Patent: Jul. 15, 2025

(54) FRACTALET RADAR WAVEFORM GENERATORS (71) Applicant: GM CRUISE HOLDINGS LLC, San Francisco, CA (US)

(72) Inventor: Daniel Flores Tapia, Fairfield, CA (US)

(73) Assignee: GM CRUISE HOLDINGS LLC, San Francisco, CA (US)

(*) Notice: Subject to any disclaimer, the term of this patent is extended or adjusted under 35 U.S.C. 154(b) by 370 days.

(21) Appl. No.: 17/833,079

(22) Filed: Jun. 6, 2022

(65) Prior Publication Data

US 2023/0393266 A1  Dec. 7, 2023

(51) Int. Cl.
  G01S 13/931  (2020.01)
  G01S 7/03  (2006.01)
  G01S 7/35  (2006.01)
  G01S 13/34  (2006.01)

(52) U.S. Cl.
  CPC ............ G01S 13/931 (2013.01); *G01S 7/03* (2013.01); *G01S 7/35* (2013.01); *G01S 13/34* (2013.01)

(58) Field of Classification Search
  CPC . G01S 13/931; G01S 7/03; G01S 7/35; G01S 13/34
  See application file for complete search history.

(56) References Cited

U.S. PATENT DOCUMENTS

| 6,353,406 B1* | 3/2002 | Lanzl .................... G01S 13/878 340/8.1 |
| 6,525,691 B2 | 2/2003 | Varadan et al. |
| 2012/0280865 A1* | 11/2012 | Gardner ................. G01S 5/021 342/463 |
| 2014/0197983 A1* | 7/2014 | Reuter .................. G01S 13/343 342/175 |

(Continued)

FOREIGN PATENT DOCUMENTS

KR  20210072662  6/2021

OTHER PUBLICATIONS

Extended European Search Report for EP Application No. 23170427. 1-12.06, mailing date Oct. 20, 2023, European Patent Office, 21 pages.

*Primary Examiner* — Timothy A Brainard
*Assistant Examiner* — Ismaaeel A. Siddiquee
(74) *Attorney, Agent, or Firm* — CANTOR COLBURN LLP (57) ABSTRACT

A radio detection and ranging (RADAR) sensor system signal generator is disclosed. The signal generator includes a lower frequency oscillator circuit to generate a first reference signal having a first frequency, a higher frequency oscillator circuit to generate a second reference signal having a second frequency that is higher than the first frequency, a set of frequency multipliers and signal mixers coupled to receive the first reference signal and the second reference signal, the set of frequency multipliers and signal mixers to (Continued)

generate a plurality of baseline signals, voltage-to-frequency converters to generate radar frequency waveforms at a plurality of specified frequencies according to chirp parameters for a plurality of frequency bands, and modulating radio frequency mixers to mix the plurality of baseline signals with the radar frequency waveforms at the plurality of specified frequencies to generate a multifrequency wavelet RADAR waveform.

20 Claims, 7 Drawing Sheets

(56) References Cited

U.S. PATENT DOCUMENTS

| | | | |
|---|---|---|---|
| 2021/0033691 A1* | 2/2021 | Solodky | G01S 1/24 |
| 2021/0055734 A1* | 2/2021 | Yokev | G08G 1/163 |
| 2021/0336325 A1* | 10/2021 | Cohen | H01Q 1/2283 |

* cited by examiner

FRACTALET RADAR WAVEFORM GENERATORS

This application is related to U.S. Non-Provisional Patent Application No. 17/833,083, entitled "Fractalet Radar Processing", filed on Jun. 6, 2022, the contents of which are incorporated herein by reference in their entirety and for all purposes.

TECHNICAL FIELD

Examples provided herein relate to signal generation for automotive radio detection and ranging (RADAR) sensor systems. More particularly, examples provided herein relate to use of RADAR waveforms that are modeled after a fractal pattern where the waveform at a small scale (i.e., higher frequencies) mimics the behavior of the large-scale components of the waveform (lower frequencies), referred to herein as fractalet signals.

BACKGROUND

Autonomous vehicles, also known as self-driving cars, driverless vehicles, and robotic vehicles, may be vehicles that use multiple sensors to sense the environment and move without human input. The sensors (and sensor systems) can include cameras and/or RADAR systems to provide information about the autonomous vehicle operating environment to control systems of the autonomous vehicle. The RADAR systems include RADAR frequency signal generation architectures.

Automation technology in the autonomous vehicles may enable the vehicles to drive on roadways and to accurately and quickly perceive the vehicle's environment, including obstacles, signs, and traffic lights. Autonomous technology may utilize map data that can include geographical information and semantic objects (such as parking spots, lane boundaries, intersections, crosswalks, stop signs, traffic lights) for facilitating driving safety. The autonomous vehicles can be used to pick up passengers and drive the passengers to selected destinations. The autonomous vehicles can also be used to pick up packages and/or other goods and deliver the packages and/or goods to selected destinations.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Current automotive radio detection and ranging (RADAR) sensor systems are designed around single frequency band (e.g., 77-81 GHz) or dual frequency band (e.g., 21-24.5 GHz and 77-81 GHz) architectures. Other frequency bands can be used as frequency bands are generally determined on the bandwidth allocation that provides the necessary spatial resolution.

However, these high frequency bands have limitations that reduce the utility of RADAR technology in, for example, dense, complex scenarios. For example, high frequency RADAR signals provide limited penetration in dense foliage or dense snow. As the frequency of the RADAR waveform increases the ability to penetrate sparse structures (like dense foliage or dense snow) decreases because the waveform is more likely to interact with the granular components of these structures.

As another example, the high frequency RADAR signals may result in higher levels of clutter. As the RADAR signal waveform frequency increases the waveform is more likely to interact with asphalt (e.g., unevenness in the road) and/or concrete structure details (e.g., building corners) to generate higher levels of clutter than can potentially mask targets of interest. Clutter refers to radio frequency (RF) echoes returned from targets in the scene that are not relevant to the purpose of operation of the RADAR sensor system. In the automotive radar system setting this can include, for example, vegetation beyond the vehicle operating environment, precipitation, birds, etc.

In the various examples described below, a RADAR frequency signal generator can generate RADAR waveforms containing both high frequency (e.g., 24 GHz, 77 GHz) and low frequency (e.g., 2.5 GHz, 5.8 GHz, 60 GHz) components. In an example, these multifrequency RADAR waveforms can be used in an automotive RADAR system.

Compared to previous modulation schemes in which the higher frequency bands are combined with a single lower frequency carrier, the approaches described herein use linear modulation schemes that are mimicked among the different frequency bands. This can provide additional resilience to noise and clutter and can allow a robust detection and external device interference rejection, which can overcome some or all of the limitations of previous automotive radar systems discussed above.

Figure 3:
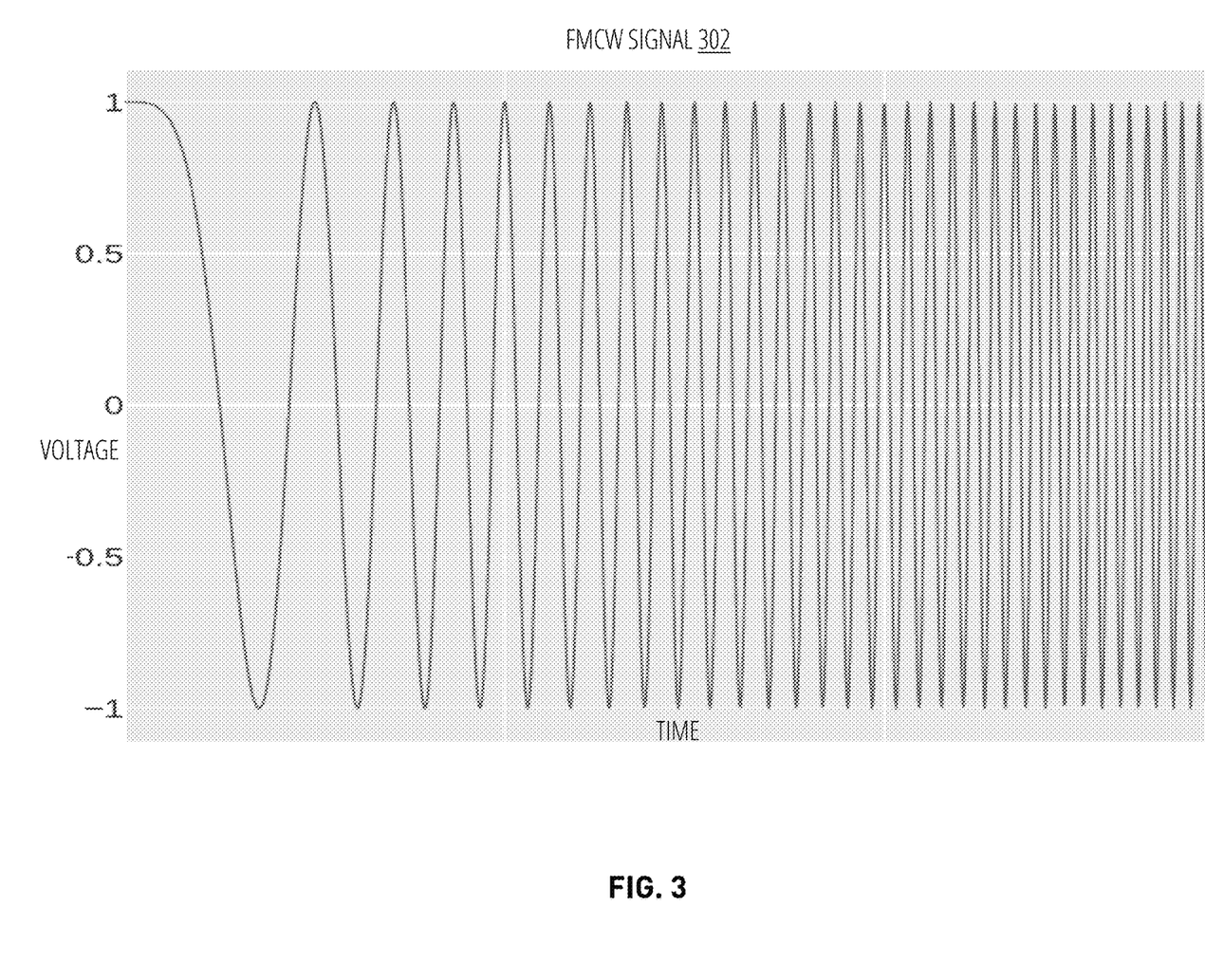
FIG. 3 illustrates an example frequency-modulated continuous wave (FMCW) RADAR signal.
Figure 4:
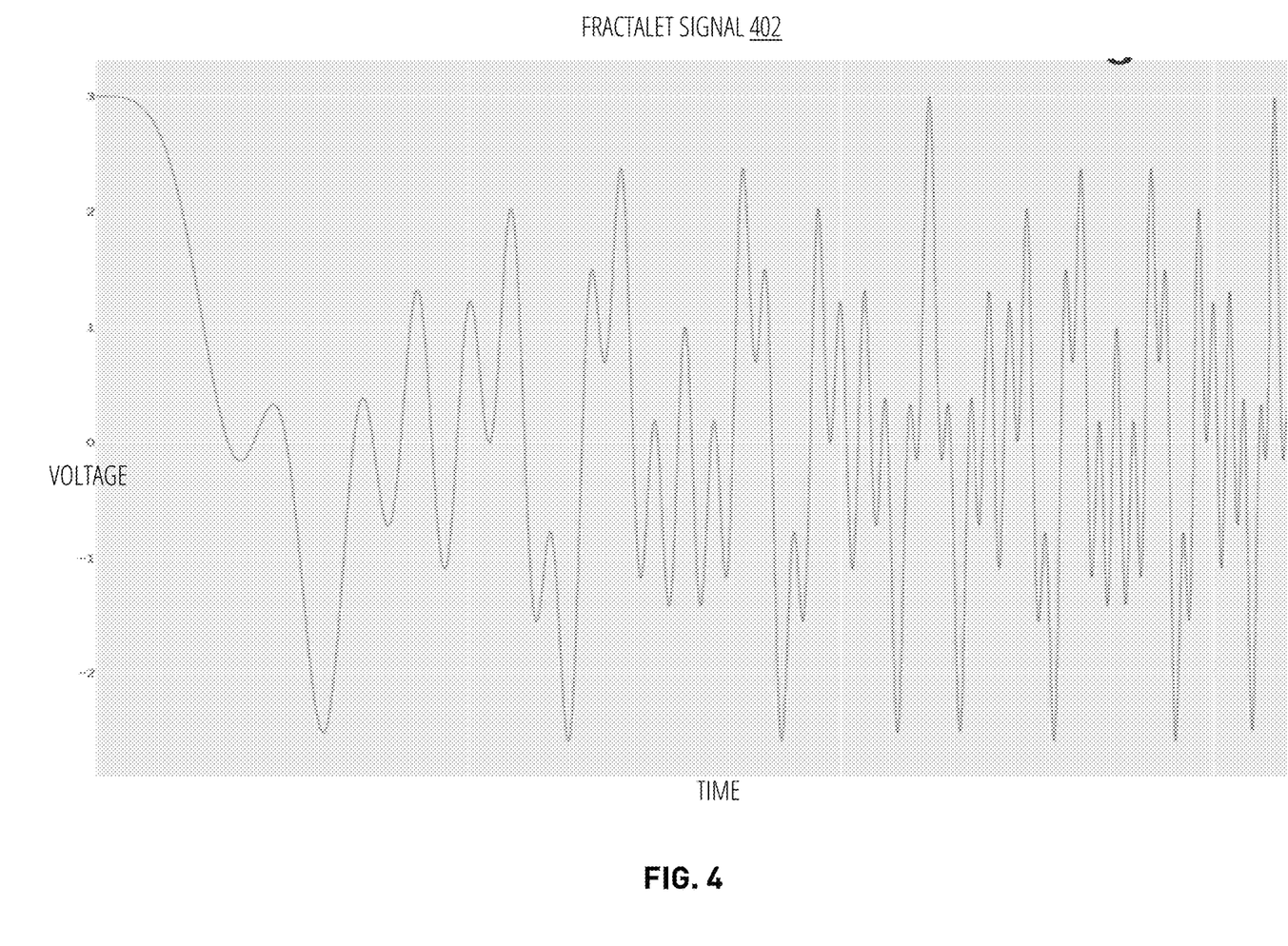
FIG. 4 illustrates an example fractalet RADAR signal.

In the example approaches described below, RADAR waveforms generated using the architectures described can be referred to as "fractalet" waveforms because they are modeled after a fractal pattern where the waveform at a small scale (i.e., higher frequencies) mimics the behavior of the large-scale components of the waveform (lower frequencies). An example fractalet RADAR waveform is illustrated in FIG. 4 and, in contrast, an example conventional frequency-modulated continuous wave (FMCW) RADAR signal is illustrated in FIG. 3.

Use of the fractalet RADAR waveforms can allow for improved detection of environmental clutter responses that can cause issues at the higher-frequency bands (e.g., 77 GHz) that can be caused by, for example, vegetation and fence structures. Use of the fractalet RADAR waveforms can also provide improved resilience to external interference due to the presence of multiple frequencies and their self-similarity relationship. Also, due to the lower frequencies that allow for a higher degree of waveform diffraction, the fractalet RADAR waveforms can provide information about partially occluded objections, which provides an overall higher degree of information about the surrounding environment.

Figure 1:
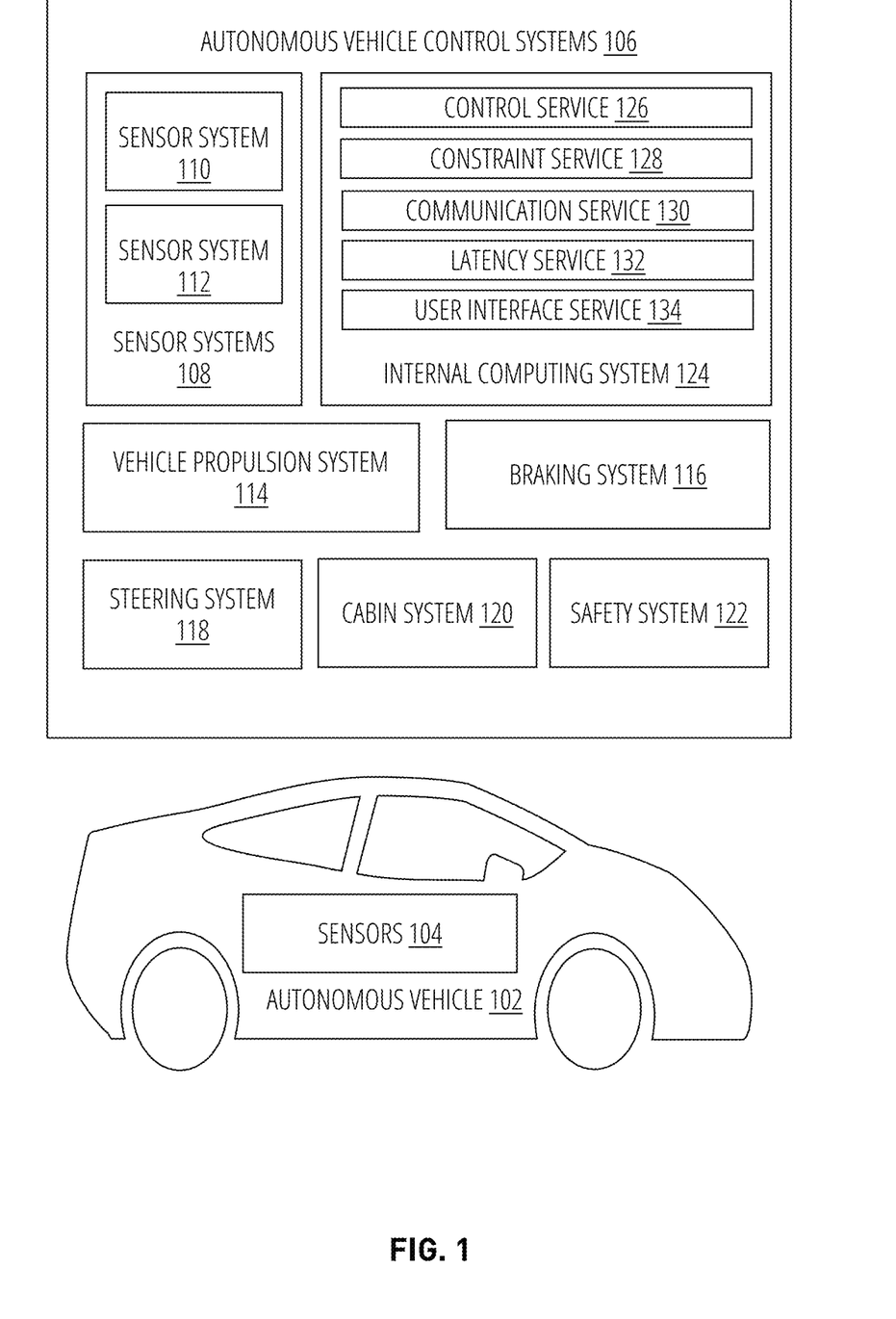
FIG. 1 is a block diagram of an example autonomous vehicle.

FIG. 1 is a block diagram of an example autonomous vehicle. Autonomous vehicle 102 has the functionality to navigate roads without a human driver by utilizing sensors 104 and autonomous vehicle control systems 106.

Autonomous vehicle 102 can include, for example, sensor systems 108 including any number of sensor systems (e.g., sensor system 110, sensor system 112). Sensor systems 108 can include various types of sensors that can be arranged throughout autonomous vehicle 102. For example, sensor system 110 can be a camera sensor system. As another example, sensor system 112 can be a light detection and ranging (LIDAR) sensor system. As a further example, one of sensor systems 108 can be a radio detection and ranging (RADAR) sensor system, an electromagnetic detection and ranging (EmDAR) sensor system, a sound navigation and ranging (SONAR) sensor system, a sound detection and ranging (SODAR) sensor system, a global navigation satellite system (GNSS) receiver system, a global positioning system (GPS) receiver system, accelerometers, gyroscopes, inertial measurement unit (IMU) systems, infrared sensor systems, laser rangefinder systems, microphones, etc.

In various examples described in greater detail below, one or more of the RADAR systems of autonomous vehicle 102 can utilize fractalet RADAR waveforms to provide information to internal computing system 124 of autonomous vehicle 102 through sensor systems 108. The improved information can be used by internal computing system 124 to control operation of autonomous vehicle 102 via one or more of vehicle propulsion system 114, braking system 116, steering system 118, cabin system 120 and/or safety system 122. In a human-operated vehicle having an advanced driver assistance system (ADAS), the sensor systems can provide feedback and/or control system assistance to the driver based on information gathered by the RADAR system.

Autonomous vehicle 102 can further include mechanical systems to control and manage motion of autonomous vehicle 102. For example, the mechanical systems can include vehicle propulsion system 114, braking system 116, steering system 118, cabin system 120 and safety system 122. Vehicle propulsion system 114 can include, for example, an electric motor, an internal combustion engine, or both. Braking system 116 can include an engine brake, brake pads, actuators and/or other components to control deceleration of autonomous vehicle 102. Steering system 118 can include components that control the direction of autonomous vehicle 102. Cabin system 120 can include, for example, cabin temperature control systems, in-cabin infotainment systems and other internal elements.

Safety system 122 can include various lights, signal indicators, airbags, systems that detect and react to other vehicles. Safety system 122 can include one or more radar systems. Autonomous vehicle 102 can utilize different types of radar systems, for example, long-range radar (LRR), mid-range radar (MRR) and/or short-range radar (SRR). LRR systems can be used, for example, to detect objects that are farther away (e.g., 200 meters, 300 meters) from the vehicle transmitting the signal. LRR systems can operate in the 77 GHz band (e.g., 76-81 GHz). SRR systems can be used, for example, for blind spot detection or collision avoidance. SRR systems can operate in the 24 GHz band. MRR systems can operate in either the 24 GHz band or the 77 GHz band. Other frequency bands can also be supported.

Autonomous vehicle 102 can further include internal computing system 124 that can interact with sensor systems 108 as well as the mechanical systems (e.g., vehicle propulsion system 114, braking system 116, steering system 118, cabin system 120 and safety system 122). Internal computing system 124 includes at least one processor and at least one memory system that can store executable instructions to be executed by the processor. Internal computing system 124 can include any number of computing subsystems that can function to control autonomous vehicle 102. Internal computing system 124 can receive inputs from passengers and/or human drivers within autonomous vehicle 102.

Internal computing system 124 can include control service 126, which functions to control operation of autonomous vehicle 102 via, for example, the mechanical systems as well as interacting with sensor systems 108. Control service 126 can interact with other systems (e.g., constraint service 128, communication service 130, latency service 132 and internal computing system 124) to control operation of autonomous vehicle 102.

Internal computing system 124 can also include constraint service 128, which functions to control operation of autonomous vehicle 102 through application of rule-based restrictions or other constraints on operation of autonomous vehicle 102. Constraint service 128 can interact with other systems (e.g., control service 126, communication service 130, latency service 132, user interface service 134) to control operation of autonomous vehicle 102.

Internal computing system 124 can further include communication service 130, which functions to control transmission of signals from, and receipt of signals by, autonomous vehicle 102. Communication service 130 can interact with safety system 122 to provide the waveform sensing, amplification and repeating functionality described herein. Communication service 130 can interact with other systems (e.g., control service 126, constraint service 128, latency service 132 and user interface service 134) to control operation of autonomous vehicle 102.

Internal computing system 124 can also include latency service 132, which functions to provide and/or utilize timestamp information on communications to help manage and coordinate time-sensitive operations within internal computing system 124 and autonomous vehicle 102. Thus, latency service 132 can interact with other systems (e.g., control service 126, constraint service 128, communication service 130, user interface service 134) to control operation of autonomous vehicle 102.

Internal computing system 124 can further include user interface service 134, which functions to provide information to, and receive inputs from, human passengers within autonomous vehicle 102. This can include, for example, receiving a desired destination for one or more passengers and providing status and timing information with respect to arrival at the desired destination. User interface service 134 can interact with other systems (e.g., control service 126, constraint service 128, communication service 130, latency service 132) to control operation of autonomous vehicle 102.

Internal computing system 124 can function to send and receive signals from autonomous vehicle 102 regarding reporting data for training and evaluating machine learning algorithms, requesting assistance from a remote computing system or a human operator, software updates, rideshare information (e.g., pickup and/or dropoff requests and/or locations), etc.

In some examples described herein autonomous vehicle 102 (or another device) may be described as collecting data corresponding to surrounding vehicles. This data may be collected without associated identifiable information from these surrounding vehicles (e.g., without license plate numbers, make, model, and the color of the surrounding vehicles). Accordingly, the techniques mentioned here can because for the beneficial purposes described, but without the need to store potentially sensitive information of the surrounding vehicles.

Figure 2:
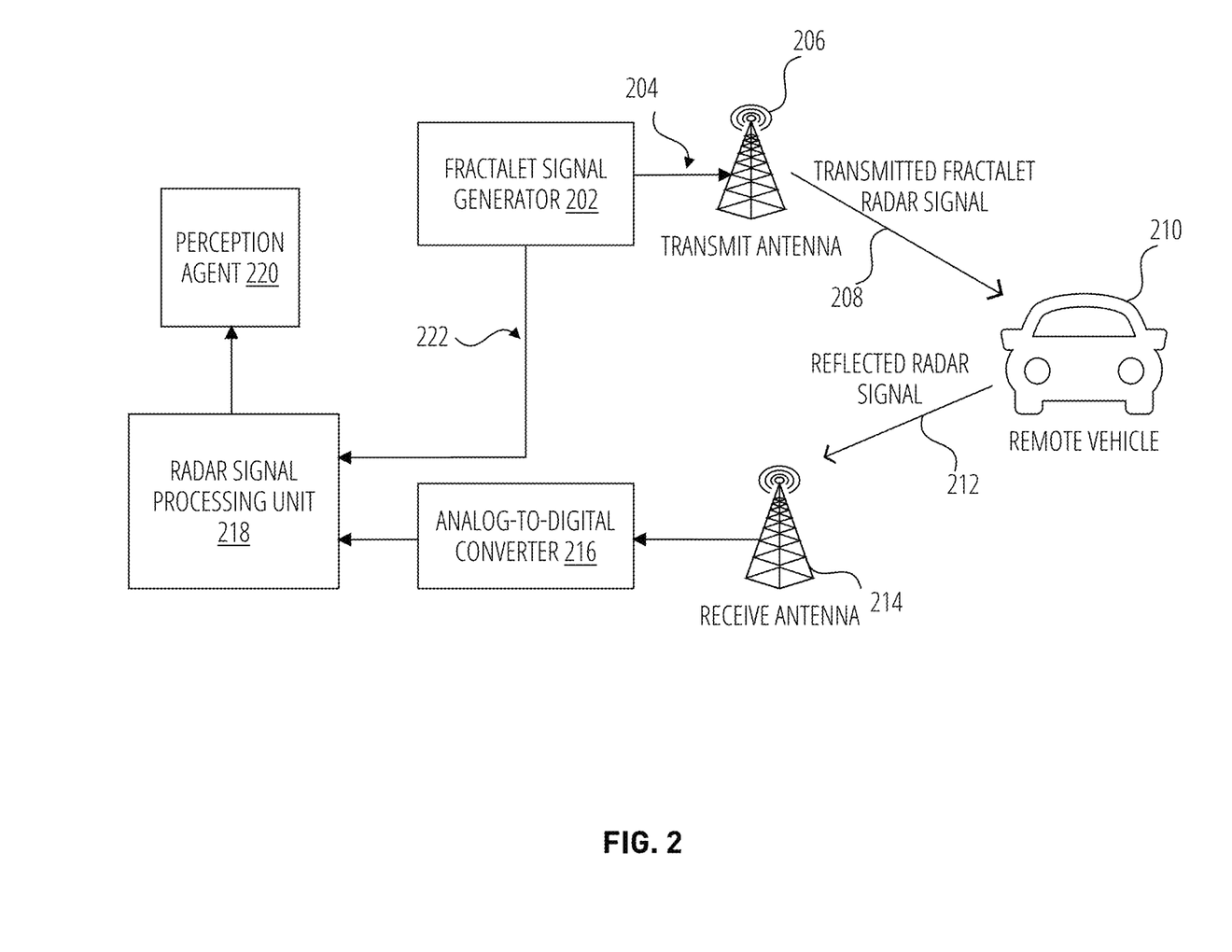
FIG. 2 a block diagram of an example fractalet-based automotive radar system illustrating transmit and receive capability.

FIG. 2 a block diagram of an example fractalet-based automotive radar system illustrating transmit and receive capability. The radar system of FIG. 2 can be, for example, one of sensor systems 108 in autonomous vehicle 102. In other examples, the automotive radar system of FIG. 2 can be part of a human-operated vehicle having an ADAS that can utilize various sensors including RADAR sensors.

Fractalet signal generator 202 can be, for example, a signal generator that produces a fractalet RADAR signal to be transmitted from, for example, a host platform (e.g., autonomous vehicle 102, human operated ADAS vehicle, automated delivery vehicle). An example fractalet RADAR waveform is illustrated in FIG. 4 and, in contrast, a conventional frequency-modulated continuous wave (FMCW) RADAR signal is illustrated in FIG. 3. An example fractalet signal generator is described in greater detail in FIG. 5.

The signal generated by fractalet signal generator 202 provides a fractalet radar frequency signal 204 to be transmitted by transmit antenna 206 (which can be a single antenna or an antenna array) as transmitted fractalet RADAR signal 208. In an example, transmit antenna 206 is a fractal antenna that can have similar transmission characteristics at all frequencies of interest. Transmitted fractalet RADAR signal 208 can be reflected by a remote object, for example, remote vehicle 210. Reflected radar signal 212 is detected by receive antenna 214, which can be a single antenna or an antenna array.

Baseline signals 222 (described in greater detail with respect to FIG. 5) are transmitted from fractalet signal generator 202 to the receiving stage heterodyne mixers (not illustrated in FIG. 2) in RADAR signal processing unit 218 to allow correlation and processing of the received signals. In an example, baseline signals 222 are the same as (or very similar to) fractalet radar frequency signal 204. Reflected radar signals 212 from receive antenna 214 are digitized by analog-to-digital converter 216 to generate digital RADAR waveforms that are transmitted to RADAR signal processing unit 218.

RADAR signal processing unit 218 can provide information to perception agent 220 in the form of a point cloud, which can be utilized to control an autonomous vehicle, or to provide driver feedback and/or assistance in an ADAS environment.

FIG. 3 illustrates an example frequency-modulated continuous wave (FMCW) RADAR signal. FMCW RADAR signals are a series of chirps, which are sinusoid signals having frequencies that sweep from a pre-selected minimum frequency to a pre-selected maximum frequency. Various hardware architectures exist to generate FMCW RADAR signals.

In the example of FIG. 3 FMCW signal 302 is illustrated with voltage on the vertical axis and time on the horizontal axis. As illustrated, FMCW signal 302 has a relative maximum voltage of 1 (corresponding to the maximum voltage swing) and a relative minimum voltage of −1 (corresponding to the minimum voltage swing). Any actual maximum and minimum voltage can be supported. The example of FMCW signal 302 conceptually illustrates a specific frequency sweep; however, other frequency sweeps can also be supported.

FIG. 4 illustrates an example fractalet RADAR signal. The example fractalet RADAR signal provides an increased frequency content as compared to the FMCW RADAR signal of FIG. 3. An example architecture for generating fractalet signal 402 is provided in FIG. 5.

In the example of FIG. 4 fractalet signal 402 is illustrated with voltage on the vertical axis and time on the horizontal axis. As illustrated, fractalet signal 402 has a relative maximum voltage of 3 (corresponding to the maximum voltage swing) and a relative minimum voltage of −3 (corresponding to the minimum voltage swing) because, in the example of FIG. 4, three signals are combined. Any actual maximum and minimum voltage can be supported by combining different number of signals having the same or different power levels. The example of fractalet signal 402 conceptually illustrates a specific frequency sweep; however, other frequency sweeps can also be supported.

Figure 5:
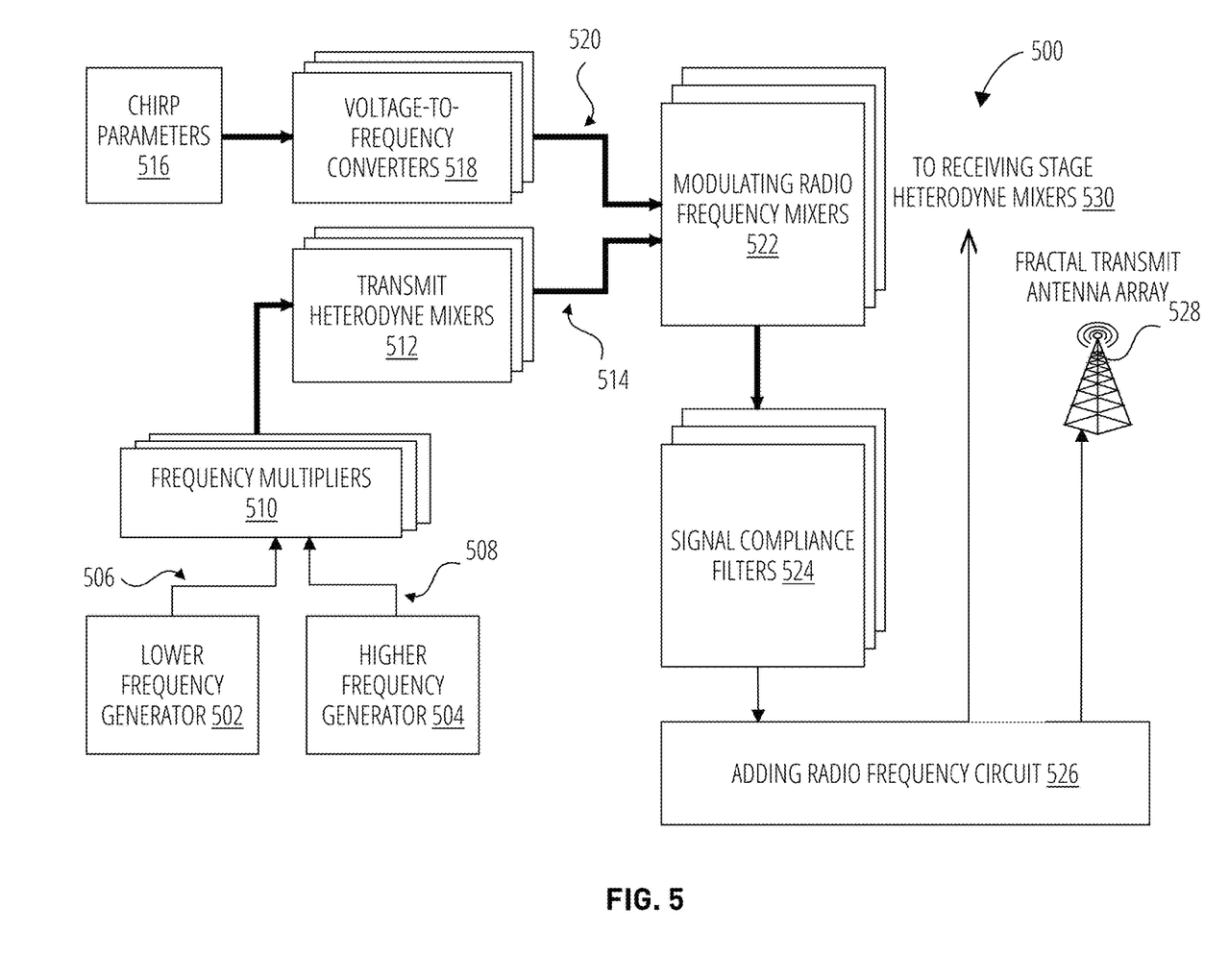
FIG. 5 is a block diagram of an example fractalet RADAR signal generator.

FIG. 5 is a block diagram of an example fractalet RADAR signal generator. Fractalet RADAR signal generator architecture 500 as illustrated in FIG. 5 can be, for example, fractalet signal generator 202 and transmit antenna 206 of FIG. 2.

A set of reference signals are generated by lower frequency generator 502 and higher frequency generator 504. In an example, lower frequency generator 502 and higher frequency generator 504 are oscillator circuits that generate reference sinusoids (e.g., lower frequency reference signal 506 and higher frequency reference signal 508). In an example, lower frequency reference signal 506 is in the 1.2 GHz range and higher frequency reference signal 508 is in the 5.7 GHz range; however, other frequency ranges can also be utilized.

Frequency multipliers 510 and transmit heterodyne mixers 512 use lower frequency reference signal 506 to generate two baseline signals (part of baseline signals 514). In an example based on lower frequency reference signal 506 being in the 1.2 GHz range, frequency multipliers 510 and transmit heterodyne mixers 512 use lower frequency reference signal 506 to generate baseline signals at approximately 2.45 GHz and 77 GHz. Other baseline signal frequencies can be supported by, for example, using a different reference signal.

Frequency multipliers 510 and transmit heterodyne mixers 512 use both lower frequency reference signal 506 and higher frequency reference signal 508 to generate two additional baseline signals (also part of baseline signals 514). In an example based on lower frequency reference signal 506 being in the 1.2 GHz range and higher frequency reference signal 508 being in the 5.7 GHz range, frequency multipliers 510 and transmit heterodyne mixers 512 generate baseline signals at approximately 21 GHz and 60 GHz. Other baseline signal frequencies can also be supported by, for example, using different reference signals.

A baseline chirp rate is defined based on the RADAR operating mode. In an example, chirp parameters 516 provide the baseline chirp rate and/or other relevant parameters. Based on the baseline chirp rate from chirp parameters 516, a frequency oscillating waveform is created by voltage-to-frequency converters 518. In an example, voltage-to-frequency converters 518 generate the specified waveforms (e.g., FMCW waveforms 520) at each band specified by chirp parameters 516.

Modulating radio frequency mixers 522 modulate FMCW waveforms 520 to their corresponding bands. Bandwidth coverage is filtered to comply with frequency allocations by signal compliance filters 524. These filters also provide power compliance at each band.

Compliant chirps are added by adding radio frequency circuit 526 and transmitted via fractal transmit antenna array 528. The baseline signals are also transmitted to receiving stage heterodyne mixers 530 (e.g., in RADAR signal processing unit 218) to allow correlation and processing of responses from targets (e.g., remote vehicle 210) in the scan area. Thus, the resulting signal to be transmitted by fractal transmit antenna array 528 includes all principal values with no multiplexing (either in time or in phase).

Figure 6:
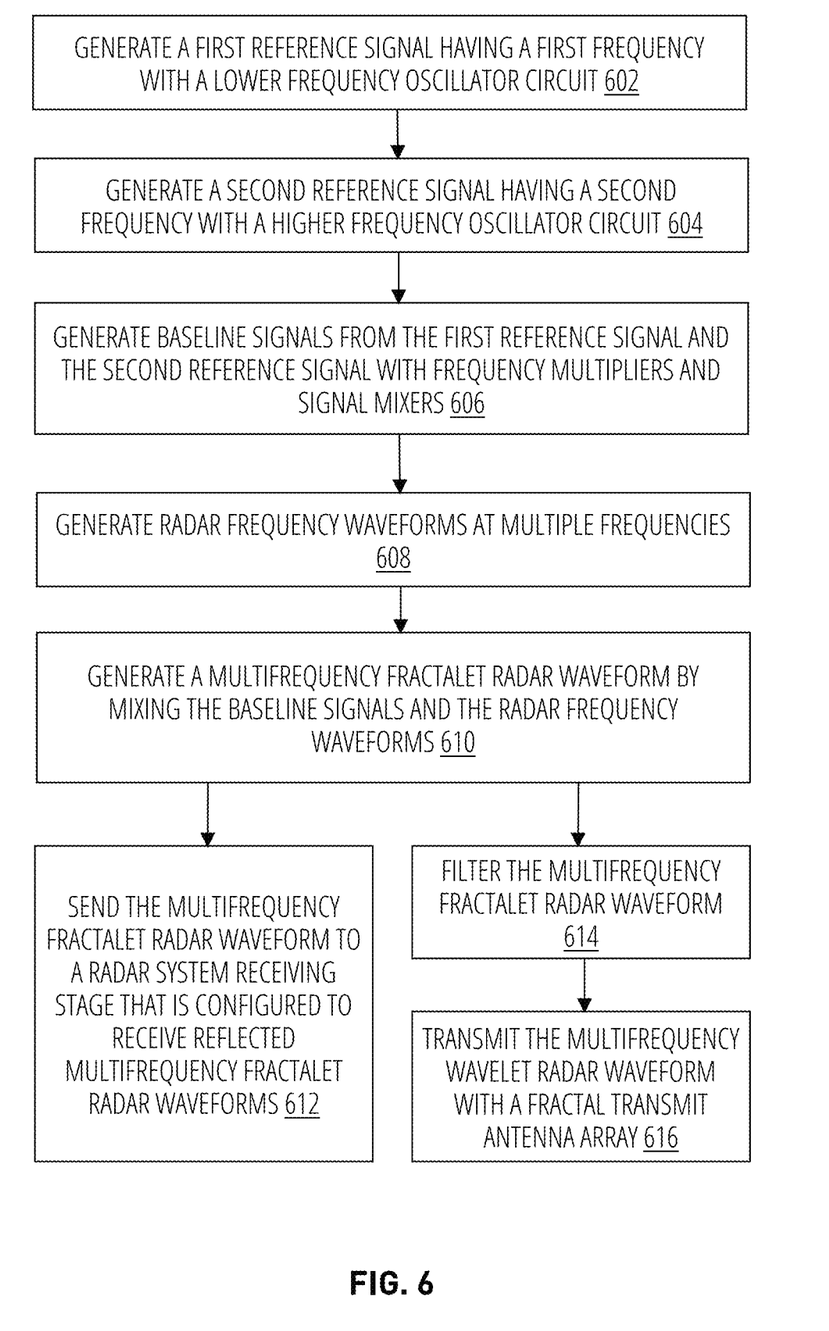
FIG. 6 is a flow diagram for an example technique for generation and transmission of a fractalet RADAR signal.

FIG. 6 is a flow diagram for an example technique for generation and transmission of a fractalet RADAR signal. The functionality of FIG. 6 can be provided by, for example, autonomous vehicle control systems 106 within autonomous vehicle 102, as illustrated in FIG. 1. In other examples, the functionality of FIG. 6 can be provided by systems within a human-operated vehicle having an ADAS that can utilize various sensors including camera systems and radar sensors.

A first reference signal having a first frequency is generated with a lower frequency oscillator circuit, block 602. In an example, the lower frequency oscillator circuit generates a reference sinusoid with a frequency in the 1.2 GHz range; however, other frequency ranges can also be utilized.

A second reference signal having a second frequency is generated with a higher frequency oscillator circuit, block 604. In an example, the higher frequency oscillator circuit generates a reference sinusoid with a frequency in the 5.7 GHz range; however, other frequency ranges can also be utilized.

Baseline signals are generated from the first reference signal and the second reference signal with frequency multipliers and signal mixers, block 606. In an example, the 1.2 GHz range reference signal is used to generate baseline signals in the 2.45 GHz and 77 GHz ranges, and the 1.2 GHz range reference signal and the 5.7 GHz range reference signal are used to generate baseline signals in the 21 GHz and 60 GHz ranges. Alternatively, baseline signals can be generated in other frequency bands.

RADAR frequency waveforms are generated at multiple selected frequencies, block 608. In an example, the waveforms are FMCW RADAR frequency waveforms that are generated for each frequency band to be utilized in the final fractalet signal. In an example the FMCW RADAR frequency waveforms can be in the 24 GHz and 77 GHz ranges; however, other frequency ranges can also be supported.

A multifrequency fractalet RADAR waveform is generated by mixing the baseline signals and the RADAR frequency waveforms, block 610. An example fractalet RADAR waveform is illustrated in FIG. 4. The fractalet RADAR waveform includes signals for the various frequency ranges supported with no multiplexing (either in time or in phase).

The multifrequency fractalet RADAR waveform is sent to a RADAR system receiving stage that is configured to receive reflected multifrequency fractalet RADAR waveforms, block 612. This allows for correlation and processing of responses from transmitted fractalet RADAR waveforms. In an example, the multifrequency fractalet RADAR waveform is provided to a receiving stage heterodyne mixer.

The multifrequency fractalet RADAR waveform is filtered, block 614. The waveform can be filtered to comply with frequency allocations. Filtering can also provide power compliance at each band. The multifrequency wavelet RADAR waveform is transmitted with a fractal transmit antenna array, block 616. The resulting signal to be transmitted by fractal transmit antenna array 528 includes all principal values with no multiplexing (either in time or in phase).

Figure 7:
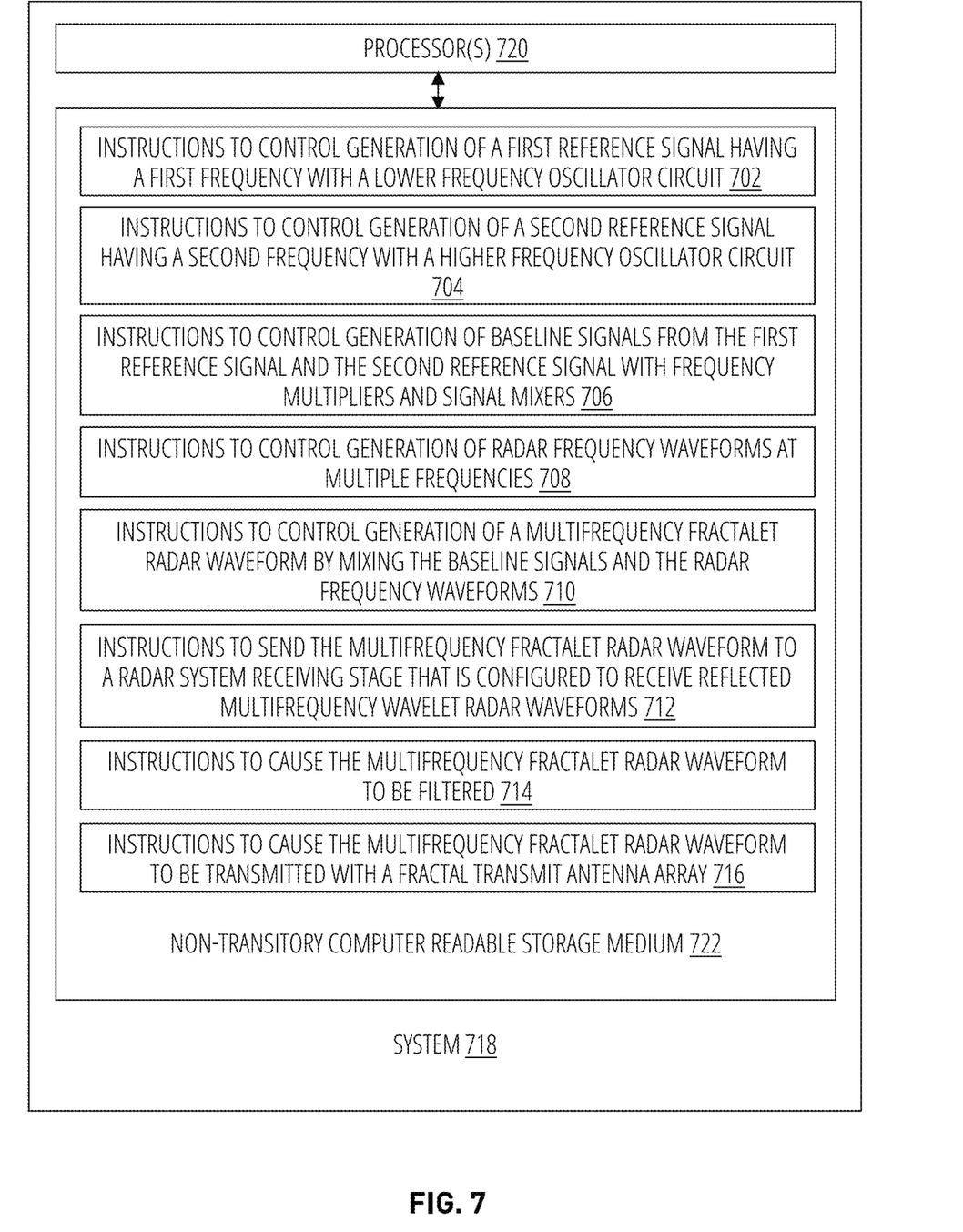
FIG. 7 is a block diagram of one example of a processing system that can provide generation and transmission of a fractalet RADAR signal.

FIG. 7 is a block diagram of one example of a processing system that can provide generation and transmission of a fractalet RADAR signal. In one example, system 718 can be part of an autonomous vehicle (e.g., autonomous vehicle 102 as part of internal computing system 124) that utilizes various sensors including radar sensors. In other examples, system 718 can be part of a human-operated vehicle having an advanced driver assistance system (ADAS) that can utilized various sensors including radar sensors.

In an example, system 718 can include processor(s) 720 and non-transitory computer readable storage medium 722. Non-transitory computer readable storage medium 722 may store instructions 702, 704, 706, 708, 710, 712, 714 and 716 that, when executed by processor(s) 720, cause processor(s) 720 to perform various functions. Examples of processor(s) 720 may include a microcontroller, a microprocessor, a central processing unit (CPU), a graphics processing unit (GPU), a data processing unit (DPU), an application-specific integrated circuit (ASIC), a field programmable gate array (FPGA), a system on a chip (SoC), etc. Examples of a non-transitory computer readable storage medium 722 include tangible media such as random-access memory (RAM), read-only memory (ROM), electrically erasable programmable read-only memory (EEPROM), flash memory, a hard disk drive, etc.

Instructions 702 cause processor(s) 720 to control generation of a first reference signal having a first frequency with a lower frequency oscillator circuit. In an example, the lower frequency oscillator circuit generates a reference sinusoid with a frequency in the 1.2 GHz range; however, other frequency ranges can also be utilized.

Instructions 704 cause processor(s) 720 to control generation of a second reference signal having a second frequency with a higher frequency oscillator circuit. In an example, the higher frequency oscillator circuit generates a reference sinusoid with a frequency in the 5.7 GHz range; however, other frequency ranges can also be utilized.

Instructions 706 cause processor(s) 720 to control generation of baseline signals from the first reference signal and the second reference signal with frequency multipliers and signal mixers. In an example, the 1.2 GHz range reference signal is used to generate baseline signals in the 2.45 GHz and 77 GHz ranges, and the 1.2 GHz range reference signal and the 5.7 GHz range reference signal are used to generate baseline signals in the 21 GHz and 60 GHz ranges. Alternatively, baseline signals can be generated in other frequency bands.

Instructions 708 cause processor(s) 720 to control generation of RADAR frequency waveforms at multiple selected frequencies. In an example, the waveforms are FMCW RADAR frequency waveforms that are generated for each frequency band to be utilized in the final fractalet signal. In an example the FMCW RADAR frequency waveforms can be in the 24 GHz and 77 GHz ranges; however, other frequency ranges can also be supported.

Instructions 710 cause processor(s) 720 to control generation of s multifrequency fractalet RADAR waveform by mixing the baseline signals and the RADAR frequency waveforms. An example fractalet RADAR waveform is illustrated in FIG. 4. The fractalet RADAR waveform includes signals for the various frequency ranges supported with no multiplexing (either in time or in phase).

Instructions 712 cause processor(s) 720 to send the multifrequency fractalet RADAR waveform to a RADAR system receiving stage that is configured to receive reflected multifrequency fractalet RADAR waveforms. This allows for correlation and processing of responses from transmitted fractalet RADAR waveforms. In an example, the multifrequency fractalet RADAR waveform is provided to a receiving stage heterodyne mixer.

Instructions 714 cause processor(s) 720 to filter the multifrequency fractalet RADAR waveform. The waveform can be filtered to comply with frequency allocations. Filtering can also provide power compliance at each band.

Instructions 716 cause processor(s) 720 to transmit the multifrequency wavelet RADAR waveform is transmitted with a fractal transmit antenna array. The resulting signal to be transmitted by fractal transmit antenna array 528 includes all principal values with no multiplexing (either in time or in phase).

In an example, an autonomous vehicle has sensor systems to detect characteristics of an operating environment, the sensor systems including at least a RADAR frequency signal generator. The RADAR frequency signal generator includes a lower frequency oscillator circuit to generate a first reference signal having a first frequency, a higher frequency oscillator circuit to generate a second reference signal having a second frequency that is higher than the first frequency, a set of frequency multipliers and signal mixers coupled to receive the first reference signal and the second reference signal, the set of frequency multipliers and signal mixers to generate a plurality of baseline signals, voltage-to-frequency converters to generate radar frequency waveforms at a plurality of specified frequencies according to chirp parameters for a plurality of frequency bands, and modulating radio frequency mixers to mix the plurality of baseline signals with the radar frequency waveforms at the plurality of specified frequencies to generate a multifrequency wavelet RADAR waveform.

In an example, the first reference signal comprises a sinusoidal signal having the first frequency and the second reference signal comprises a sinusoidal signal having the second frequency. In an example, the first frequency is in a 1.2 GHz range and the second frequency is in a 5.7 GHz range. In an example, the plurality of baseline signals include baseline signals in 2.45 GHz and 77 GHz ranges based on the 1.2 GHz range reference signal, and baseline signals in 21 GHz and 60 GHz ranges based on the 1.2 GHz range reference signal and the 5.7 GHz range reference signal.

In an example, the radar frequency signal generator is further configured to send the multifrequency wavelet RADAR waveform to a RADAR system receiving stage that is configured to receive reflected multifrequency wavelet RADAR waveforms. In an example, the radar frequency signal generator further comprises one or more signal compliance filters that filter the multifrequency wavelet RADAR waveform to comply with frequency allocations prior to transmission.

In an example, a non-transitory computer-readable medium has stored thereon instructions that, when executed by one or more processors, are configurable to cause the processors to cause a lower frequency oscillator circuit to generate a first reference signal having a first frequency to cause a higher frequency oscillator circuit to generate a second reference signal having a second frequency that is higher than the first frequency to cause a set of frequency multipliers and signal mixers coupled to receive the first reference signal and the second reference signal to generate a plurality of baseline signals, to cause generation of radar frequency waveforms at a plurality of specified frequencies, and to cause mixing of the plurality of baseline signals with the radar frequency waveforms at the plurality of specified frequencies to generate a multifrequency fractalet RADAR waveform.

In an example, the first reference signal comprises a sinusoidal signal having the first frequency and the second reference signal comprises a sinusoidal signal having the second frequency. In an example, the first frequency is in a 1.2 GHz range and the second frequency is in a 5.7 GHz range. In an example, the plurality of baseline signals include baseline signals in 2.45 GHz and 77 GHz ranges based on the 1.2 GHz range reference signal, and baseline signals in 21 GHz and 60 GHz ranges based on the 1.2 GHz range reference signal and the 5.7 GHz range reference signal.

In an example, the radar frequency signal generator is further configured to send the multifrequency wavelet RADAR waveform to a RADAR system receiving stage that is configured to receive reflected multifrequency wavelet RADAR waveforms. In an example, the radar frequency signal generator further comprises one or more signal compliance filters that filter the multifrequency wavelet RADAR waveform to comply with frequency allocations prior to transmission.

In an example, a system includes a lower frequency oscillator circuit to generate a first reference signal having a first frequency, a higher frequency oscillator circuit to generate a second reference signal having a second frequency that is higher than the first frequency, a set of frequency multipliers and signal mixers coupled to receive the first reference signal and the second reference signal, the set of frequency multipliers and signal mixers to generate a plurality of baseline signals, voltage-to-frequency converters to generate radar frequency waveforms at a plurality of specified frequencies according to chirp parameters for a plurality of frequency bands, and modulating radio frequency mixers to mix the plurality of baseline signals with the radar frequency waveforms at the plurality of specified frequencies to generate a multifrequency wavelet RADAR waveform.

In an example, the system also includes at least one fractal transmit antenna array. In an example, the system is part of an autonomous vehicle.

In an example, the first reference signal comprises a sinusoidal signal having the first frequency and the second reference signal comprises a sinusoidal signal having the second frequency. In an example, the first frequency is in a 1.2 GHz range and the second frequency is in a 5.7 GHz range. In an example, the plurality of baseline signals include baseline signals in 2.45 GHz and 77 GHz ranges based on the 1.2 GHz range reference signal, and baseline signals in 21 GHz and 60 GHz ranges based on the 1.2 GHz range reference signal and the 5.7 GHz range reference signal.

In an example, the radar frequency signal generator is further configured to send the multifrequency wavelet RADAR waveform to a RADAR system receiving stage that is configured to receive reflected multifrequency wavelet RADAR waveforms. In an example, the radar frequency signal generator further comprises one or more signal compliance filters that filter the multifrequency wavelet RADAR waveform to comply with frequency allocations prior to transmission.

In the description above, for the purposes of explanation, numerous specific details are set forth in order to provide a thorough understanding of the described examples. It will be apparent, however, to one skilled in the art that examples may be practiced without some of these specific details. In other instances, well-known structures and devices are shown in block diagram form. There may be intermediate structures between illustrated components. The components described or illustrated herein may have additional inputs or outputs that are not illustrated or described.

Various examples may include various processes. These processes may be performed by hardware components or may be embodied in computer program or machine-executable instructions, which may be used to cause processor or logic circuits programmed with the instructions to perform the processes. Alternatively, the processes may be performed by a combination of hardware and software.

Portions of various examples may be provided as a computer program product, which may include a non-transitory computer-readable medium having stored thereon computer program instructions, which may be used to program a computer (or other electronic devices) for execution by one or more processors to perform a process according to certain examples. The computer-readable medium may include, but is not limited to, magnetic disks, optical disks, read-only memory (ROM), random access memory (RAM), erasable programmable read-only memory (EPROM), electrically erasable programmable read-only memory (EEPROM), magnetic or optical cards, flash memory, or other type of computer-readable medium suitable for storing electronic instructions. Moreover, examples may also be downloaded as a computer program product, wherein the program may be transferred from a remote computer to a requesting computer. In some examples, non-transitory computer readable storage medium 722 has stored thereon data representing sequences of instructions that, when executed by a processor(s) 720, cause the processor(s) 720 to perform certain operations.

Reference in the specification to "an example," "one example," "some examples," or "other examples" means that a particular feature, structure, or characteristic described in connection with the examples is included in at least some examples, but not necessarily all examples. Additionally, such feature, structure, or characteristics described in connection with "an example," "one example," "some examples," or "other examples" should not be construed to be limited or restricted to those example(s), but may be, for example, combined with other examples. The various appearances of "an example," "one example," or "some examples" are not necessarily all referring to the same examples.

What is claimed is:

1. A radar apparatus comprising:
   sensor systems to detect characteristics of an operating environment comprising at least a radar frequency signal generator, the radar frequency signal generator comprising:
   a first frequency oscillator circuit to generate a first reference signal having a first frequency;
   a second frequency oscillator circuit to generate a second reference signal having a second frequency that is higher than the first frequency;
   a set of frequency multipliers and signal mixers coupled to receive the first reference signal and the second reference signal, the set of frequency multipliers and signal mixers to generate a plurality of baseline signals;
   voltage-to-frequency converters to generate radar frequency waveforms at a plurality of specified frequencies according to chirp parameters for a plurality of frequency bands; and
   modulating radio frequency mixers to mix the plurality of baseline signals with the radar frequency waveforms at the plurality of specified frequencies to generate a multifrequency fractalet RADAR waveform.

2. The radar apparatus of claim 1 wherein the first reference signal comprises a sinusoidal signal having the first frequency and the second reference signal comprises a sinusoidal signal having the second frequency.

3. The radar apparatus of claim 2 wherein the first frequency is in a 1.2 GHz range and the second frequency is in a 5.7 GHz range.

4. The radar apparatus of claim 3 wherein the plurality of baseline signals comprise baseline signals in 2.45 GHz and 77 GHz ranges based on the 1.2 GHz range reference signal, and baseline signals in 21 GHz and 60 GHz ranges based on the 1.2 GHz range reference signal and the 5.7 GHz range reference signal.

5. The radar apparatus of claim 1 wherein the radar frequency signal generator is further configured to send the multifrequency fractalet RADAR waveform to a RADAR system receiving stage that is configured to receive reflected multifrequency fractalet RADAR waveforms.

6. The radar apparatus of claim 1 wherein the radar frequency signal generator further comprises one or more signal compliance filters that filter the multifrequency fractalet RADAR waveform to comply with frequency allocations prior to transmission.

7. A non-transitory computer-readable medium having stored thereon instructions that, when executed by one or more processors, are configurable to cause the processors to:
   cause a first frequency oscillator circuit to generate a first reference signal having a first frequency;
   cause a second frequency oscillator circuit to generate a second reference signal having a second frequency that is higher than the first frequency;
   cause a set of frequency multipliers and signal mixers coupled to receive the first reference signal and the second reference signal to generate a plurality of baseline signals;
   cause generation of radar frequency waveforms at a plurality of specified frequencies;
   cause mixing of the plurality of baseline signals with the radar frequency waveforms at the plurality of specified frequencies to generate a multifrequency fractalet RADAR waveform.

8. The non-transitory computer-readable medium of claim 7 wherein the first reference signal comprises a sinusoidal signal having the first frequency and the second reference signal comprises a sinusoidal signal having the second frequency.

9. The non-transitory computer-readable medium of claim 8 wherein the first frequency is in a 1.2 GHz range and the second frequency is in a 5.7 GHz range.

10. The non-transitory computer-readable medium of claim 9 wherein the plurality of baseline signals comprise baseline signals in 2.45 GHz and 77 GHz ranges based on the 1.2 GHz range reference signal, and baseline signals in 21 GHz and 60 GHz ranges based on the 1.2 GHz range reference signal and the 5.7 GHz range reference signal.

11. The non-transitory computer-readable medium of claim 7 further comprising instructions that, when executed by the one or more processors, cause the one or more processors to send the multifrequency fractalet RADAR waveform to a RADAR system receiving stage that is configured to receive reflected multifrequency fractalet RADAR waveforms.

12. The non-transitory computer-readable medium of claim 7 wherein the first frequency oscillator circuit, the second frequency oscillator circuit and the set of frequency multipliers and signal mixers are part of an autonomous vehicle.

13. A system comprising:
 a first frequency oscillator circuit to generate a first reference signal having a first frequency;
 a second frequency oscillator circuit to generate a second reference signal having a second frequency that is higher than the first frequency;
 a set of frequency multipliers and signal mixers coupled to receive the first reference signal and the second reference signal, the set of frequency multipliers and signal mixers to generate a plurality of baseline signals;
 voltage-to-frequency converters to generate radar frequency waveforms at a plurality of specified frequencies according to chirp parameters for a plurality of frequency bands; and
 modulating radio frequency mixers to mix the plurality of baseline signals with the radar frequency waveforms at the plurality of specified frequencies to generate a multifrequency wavelet fractalet RADAR waveform.

14. The system of claim 13 wherein the first reference signal comprises a sinusoidal signal having the first frequency and the second reference signal comprises a sinusoidal signal having the second frequency.

15. The system of claim 14 wherein the first frequency is in a 1.2 GHz range and the second frequency is in a 5.7 GHz range.

16. The system of claim 15 wherein the plurality of baseline signals comprise baseline signals in 2.45 GHz and 77 GHz ranges based on the 1.2 GHz range reference signal, and baseline signals in 21 GHz and 60 GHz ranges based on the 1.2 GHz range reference signal and the 5.7 GHz range reference signal.

17. The system of claim 13 wherein the system is further configured to send the multifrequency fractalet RADAR waveform to a RADAR system receiving stage that is configured to receive reflected multifrequency fractalet RADAR waveforms.

18. The system of claim 13 wherein the first frequency oscillator circuit, the second frequency oscillator circuit and the set of frequency multipliers and signal mixers are part of an autonomous vehicle.

19. The system of claim 13 further comprising one or more signal compliance filters that filter the multifrequency fractalet RADAR waveform to comply with frequency allocations prior to transmission.

20. The system of claim 13 further comprising at least one fractal transmit antenna array.

* * * * *